United States Patent
Reitemann (10) Patent No.: US 11,441,581 B2
(45) Date of Patent: Sep. 13, 2022

(54) PRESSURIZED FLUID SUPPLY SYSTEM FOR AN AGRICULTURAL VEHICLE

(71) Applicant: AGCO International GmbH, Neuhausen (CH)

(72) Inventor: Gabriel Reitemann, by Mittelberg (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/643,392

(22) Filed: Dec. 8, 2021

(65) Prior Publication Data

US 2022/0186753 A1 Jun. 16, 2022

(30) Foreign Application Priority Data

Dec. 15, 2020 (GB) .................................. 2019738

(51) Int. Cl.
*F15B 11/17* (2006.01)
*F15B 11/16* (2006.01)
*F15B 21/0423* (2019.01)

(52) U.S. Cl.
CPC ............ *F15B 11/17* (2013.01); *F15B 11/162* (2013.01); *F15B 21/0423* (2019.01); *F15B 2211/62* (2013.01)

(58) Field of Classification Search
CPC .... F15B 11/162; F15B 11/17; F15B 21/0423; F15B 2211/611; F15B 2211/62; E02F 9/2239; E02F 9/2292
See application file for complete search history.

(56) References Cited

U.S. PATENT DOCUMENTS

| | | | |
|---|---|---|---|
| 4,061,201 A | 12/1977 | Dunn | |
| 5,507,360 A | 4/1996 | Simmons | |
| 5,875,630 A * | 3/1999 | Walsh | F16H 61/4139 60/449 |
| 8,983,741 B2 * | 3/2015 | Park | E02F 9/2235 701/50 |
| 9,885,374 B2 * | 2/2018 | Christensen | E02F 9/2095 |
| 10,746,200 B1 * | 8/2020 | Adeeb | B60T 17/04 |
| 10,822,025 B1 | 11/2020 | Adeeb et al. | |
| 2005/0217260 A1 | 10/2005 | Desjardins et al. | |
| 2006/0196720 A1 | 9/2006 | Zahniser | |

(Continued)

FOREIGN PATENT DOCUMENTS

| | | |
|---|---|---|
| DE | 3823892 A1 | 1/1990 |
| EP | 3267074 | 1/2018 |

OTHER PUBLICATIONS

European Patent Office, International Search Report related to European Application No. GB21205935.6, dated Apr. 26, 2022.

(Continued)

*Primary Examiner* — Michael Leslie (57) ABSTRACT

In a hydraulic system, such as for a tractor or other agricultural vehicle, a main supply pump supplies fluid to a steering system through a steering circuit and a second pump supplies fluid to a cooling fan motor. The second pump is connected with the steering circuit to provide a second a source of fluid to the steering system when the main supply pump is unable to meet demand. A prioritization valve regulates the flow of fluid from the second pump to the motor. The second pump acts as a secondary pump for the steering system and drives a cooling fan.

19 Claims, 2 Drawing Sheets

(56) References Cited

U.S. PATENT DOCUMENTS

2013/0312401 A1* 11/2013 Frommelt ............... B62D 5/30
60/459
2014/0225374 A1 8/2014 Collett et al.
2015/0308079 A1* 10/2015 Vigholm ............... G05B 15/02
700/282

OTHER PUBLICATIONS

UK Intellectual Property Office, Search Report for UK priority Application No. GB2019738.0, dated May 4, 2021.

* cited by examiner

PRESSURIZED FLUID SUPPLY SYSTEM FOR AN AGRICULTURAL VEHICLE

CROSS-REFERENCE TO RELATED APPLICATION

This application claims the benefit of the filing date of U.K. Patent Application GB2019783.0, "Pressurised Fluid Supply System for an Agricultural Vehicle," filed Dec. 15, 2020, the entire disclosure of which is incorporated herein by reference.

FIELD

Embodiments of the present disclosure relate generally to a pressurized fluid supply system for supplying supply various consumers in a vehicle, especially an agricultural vehicle such as a tractor. For example, embodiments relate to a pressurized hydraulic fluid supply system for a steering system and a cooling fan motor as well as other consumers of an agricultural vehicle such as a tractor.

BACKGROUND

Modern agricultural tractors are equipped with various hydraulic consumers requiring a supply of pressurized hydraulic fluid. One important hydraulic consumer is the steering system, which is supplied by various pumps to ensure steering capability in various operating conditions while the vehicle is moving, even if the engine or other prime move is shut down by damage.

In a typical supply system, a main supply pump supplies the steering system as well as auxiliary hydraulics (different consumers on the tractor, for example front and/or rear linkages, main valve manifold, and a power-beyond connection (which may be referred to in the art as a high-pressure carry over)). If the main supply pump is overloaded (which may occur if the steering moves very fast or the main supply circuit and connected consumers of the auxiliary hydraulics demand too much oil flow) and is not capable of providing the fluid pressure required to maintain the steering function, a secondary pump, the steering pump, is used to additionally supply the steering system to ensure that the vehicle can be steered. The main and secondary pumps are driven by the vehicle prime mover, which is often an internal combustion engine but may be an electric motor or a hybrid combination of the two. Should the prime mover fail, this would cut the supply of pressurized fluid and disable the hydraulic steering system. Unlike a conventional car, which can often be steered mechanically in the event that a fluid power assisted steering system fails while the vehicle is moving, agricultural vehicles cannot usually be steered adequately without fluid power assistance. Therefore, many agricultural vehicles have a third pump, referred to as an emergency steering pump, which is driven by the ground-engaging wheels and so is able to provide a supply of pressurized fluid to the steering system in the event that the prime mover fails while the vehicle is moving. This provides emergency redundancy cover for the main and secondary pumps to provide continued steering function while the vehicle is moving.

The number of hydraulic consumers used on modern tractors is increasing. For example, the increased demand for cooling capacity has resulted in the introduction of hydraulic drive systems for cooling fans. In such drive systems, a hydraulic motor that drives the cooling fan is supplied by a pump assigned only for this purpose. Such a system is described in European patent application publication EP 3267074, "Utility Vehicle Lubrication and Cooling," published Jan. 10, 2018. As a consequence, fluid supply systems of tractors are becoming more and more complex, requiring an increasing number of pumps. Increasing the number of pumps installed on a tractor increases costs and requires valuable installation space. Furthermore, increasing the number of pumps in a fluid supply system generally means reducing efficiency because each pump circulates oil even when the demand made on it is zero.

BRIEF SUMMARY

In some embodiments, a pressurized fluid supply system for an agricultural vehicle includes a main supply pump providing a first source of pressurized fluid to a steering system of the vehicle through a steering circuit and to other consumers through a main circuit; a cooling fan pump providing a source of pressurized fluid to a cooling fan motor driving a cooling fan through a cooling fan circuit; and a prioritization valve for regulating the flow of fluid from the cooling fan pump to the cooling fan motor. The prioritization valve has at least two operative configurations and is movable between the two operative configurations in dependence on the fluid pressure in the steering circuit.

The cooling fan pump is fluidly connectable with the steering circuit to be able to provide a second a source of pressurized fluid to the steering system. The prioritization valve is configured to adopt a first operative configuration in which fluid flow from the cooling fan pump to the cooling fan motor through the prioritization valve is substantially unrestricted when the pressure in the steering circuit is at or above a first threshold value and to adopt a second operative configuration in which fluid flow from the cooling fan pump to the cooling fan motor through the prioritization valve is blocked or restricted when the pressure in the steering circuit is below the first threshold value.

In some embodiments, the cooling fan pump acts as a secondary pump for the steering system and drives a cooling fan. This helps to limit the number of pumps in the system and improves overall system efficiency, while ensuring continuity of supply for the steering system to meet safety requirements.

In an embodiment, the prioritization valve may have a third operative configuration in which fluid flow from the cooling fan pump to the cooling fan motor through the prioritization valve is substantially blocked. In this embodiment, the prioritization valve is configured to adopt its second operative configuration when the fluid pressure in the steering circuit is below the first threshold value but at or above a second threshold value lower than the first threshold value and to adopt its third operative configuration when the fluid pressure in the steering circuit is below the second threshold value.

The cooling fan circuit may be fluidly connected to the steering circuit at a position upstream of the prioritization valve through a check valve that prevents fluid flowing in a direction from the steering circuit towards the cooling fan pump. The arrangement may be configured such that, in use when the prioritization valve is in its second or third operative configuration, the fluid pressure in the cooling fan circuit upstream of the prioritization valve increases, causing the check valve to open to admit pressurized fluid from the cooling fan circuit into the steering circuit when the pressure in the cooling fan circuit upstream of the prioritization valve is higher than the pressure in the steering circuit by a threshold amount.

The fluid supply system may also have an emergency steering pump fluidly connectable with a fluid tank or reservoir through an emergency steering pump circuit. In this embodiment, the prioritization valve is operative to regulate the flow of fluid in the emergency steering pump circuit from the emergency steering pump to the fluid tank or reservoir. The emergency steering pump circuit is fluidly connected with the steering circuit at a position upstream of the prioritization valve. The flow of fluid from the emergency steering pump through the prioritization valve to the tank or reservoir is substantially unrestricted when the prioritization valve is in either of its first and second operative configurations. If the prioritization valve has a third operative configuration, the flow of fluid from the emergency steering pump through the prioritization valve may be substantially blocked when the prioritization valve is in its third operative configuration.

The emergency steering circuit may be fluidly connected to the steering circuit through a check valve that prevents fluid flowing in a direction from the steering circuit to the emergency steering pump. The arrangement may be configured such that, in use when the prioritization valve is in its third operative configuration and the vehicle is moving, the fluid pressure in the emergency steering circuit upstream of the prioritization valve increases, causing the check valve to open and admit pressurized fluid to flow from the emergency steering circuit into the steering circuit when the pressure emergency steering circuit upstream of the prioritization valve is higher than the pressure in the steering circuit by a further threshold amount.

In an embodiment, the prioritization valve is a spool valve having spool with at least two positions corresponding to the at least two operative configurations. Fluid pressure in the steering circuit is applied to the spool to drive spool movement in a first direction. Fluid pressure in a steering system load sensing circuit and a biasing force from at least one resilient member is applied to the spool to drive the spool in a second direction opposite to the first direction. If the prioritization valve has a third operative configuration, the spool may have three positions, each corresponding to a respective one of the three operative configurations, and the at least one resilient member may be a two-stepped spring set.

In an embodiment, the prioritization valve is operative to restrict but not fully block the flow of fluid through the valve from the cooling fan pump to the cooling fan motor when in its second operative configuration. In this case, the prioritization valve may be configured such that the degree to which the flow of fluid through the valve from the cooling fan pump to the cooling fan motor is restricted when in its second operative configuration is variable, dependent on the fluid pressure in the steering circuit.

In an embodiment, one of the cooling fan pump and the cooling fan motor is a variable displacement machine, and the fluid supply system has a control system operative to adjust displacement of the variable displacement machine. The control system may be operative to adjust the displacement of the variable displacement machine to maintain the input drive power provided by the cooling fan motor to the cooling fan substantially constant or at demand value. Alternatively, or in addition, the control system may be operative to adjust the displacement of the variable displacement machine to vary the speed of the fan in accordance with cooling demand. The control system may include one or more sensor(s) to determine the input drive power provided by the cooling fan motor to the cooling fan, such as a pressure sensor for monitoring the pressure of the fluid supplied to the cooling fan motor and/or a speed sensor for determining the speed of the fan.

The control system may have a pressure sensor for monitoring the pressure of fluid flowing from the prioritization valve to the cooling fan motor and/or a fan speed sensor for determining the speed of the cooling fan and may be configured to adjust the displacement of the variable displacement machine based at least in part on the pressure of the fluid flowing from the prioritization valve to the cooling fan motor and/or the speed of the fan.

The control system may include one or more controllers which may collectively comprise an input (e.g. an electronic input) for receiving one or more input signals (e.g., the pressure signal and/or the fan speed signal) indicative of the input drive power provided by the cooling fan motor to the cooling fan. The one or more controllers may collectively comprise one or more processors (e.g., electronic processors) operable to execute computer readable instructions for controlling operation of the control system, for example to determine the input drive power provided by the cooling fan motor to the cooling fan. The one or more processors may be operable to generate one or more control signals for controlling the displacement of the variable displacement machine. The one or more controllers may collectively comprise an output (e.g., an electronic output) for outputting the one or more control signals.

In an embodiment, the cooling fan pump is a variable displacement pump and the cooling fan motor is a constant displacement motor. In an alternative embodiment, the cooling fan pump is a constant displacement pump and the cooling fan motor is a variable displacement motor.

The control system may include a sensor arrangement for monitoring movement of a steering system in a vehicle to which the fluid supply system is mounted. The control system may be configured to predict, based on an input or inputs from the sensor arrangement, when the steering system is expected to place an increased demand on the main supply pump likely to result in the prioritization valve moving from its first operative configuration to its second operative configuration and to adjust the displacement of the variable displacement machine in advance of the prioritization valve moving from its first operative configuration to its second operative configuration. The sensor arrangement may be configured to sense the rotary position and/or rotary movement of a steering wheel or other steering control of the vehicle.

The main supply pump may be connected to the steering circuit though a check valve that prevents fluid flow in a direction from the steering circuit to the main supply pump.

The fluid supply system may be a hydraulic fluid supply system.

In some embodiments, a hydraulic fluid system for an agricultural vehicle has a main supply pump for supplying fluid to a steering system through a steering circuit and a second pump for supplying fluid to a cooling fan motor. The second pump may be fluidly connectable with the steering circuit to provide a second a source of fluid to the steering system when the main supply pump is unable to fully meet demand. The system includes a prioritization valve which regulates the flow of fluid from the second pump to the motor. The valve has a first operative configuration in which fluid flow from the second pump to the motor is unrestricted and a second operative configuration in which fluid flow from the second pump to the motor is at least partially restricted. The arrangement is configured such that the valve is changed from its first operative configuration to its second operative configuration if the pressure in the steering circuit falls below a first threshold value.

The various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any tractor or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used throughout, ranges are used as shorthand for describing each and every value that is within the range. Any value within the range can be selected as the terminus of the range.

The consumers in a pressurized fluid supply system are connected with fluid lines or conduits which are also named as circuits in the following description. It will be understood that the term "circuit" as used herein is not limited to a closed loop arrangement of lines or conduits and may refer to arrangements as simple as a single fluid line linking two components or consumers.

Furthermore it will be understood that the term "motor" and "pump" as used herein in reference to a pressurized fluid supply system describe fluid machines which may be hydrodynamic or hydrostatic, unless the context requires otherwise.

Figure 1:
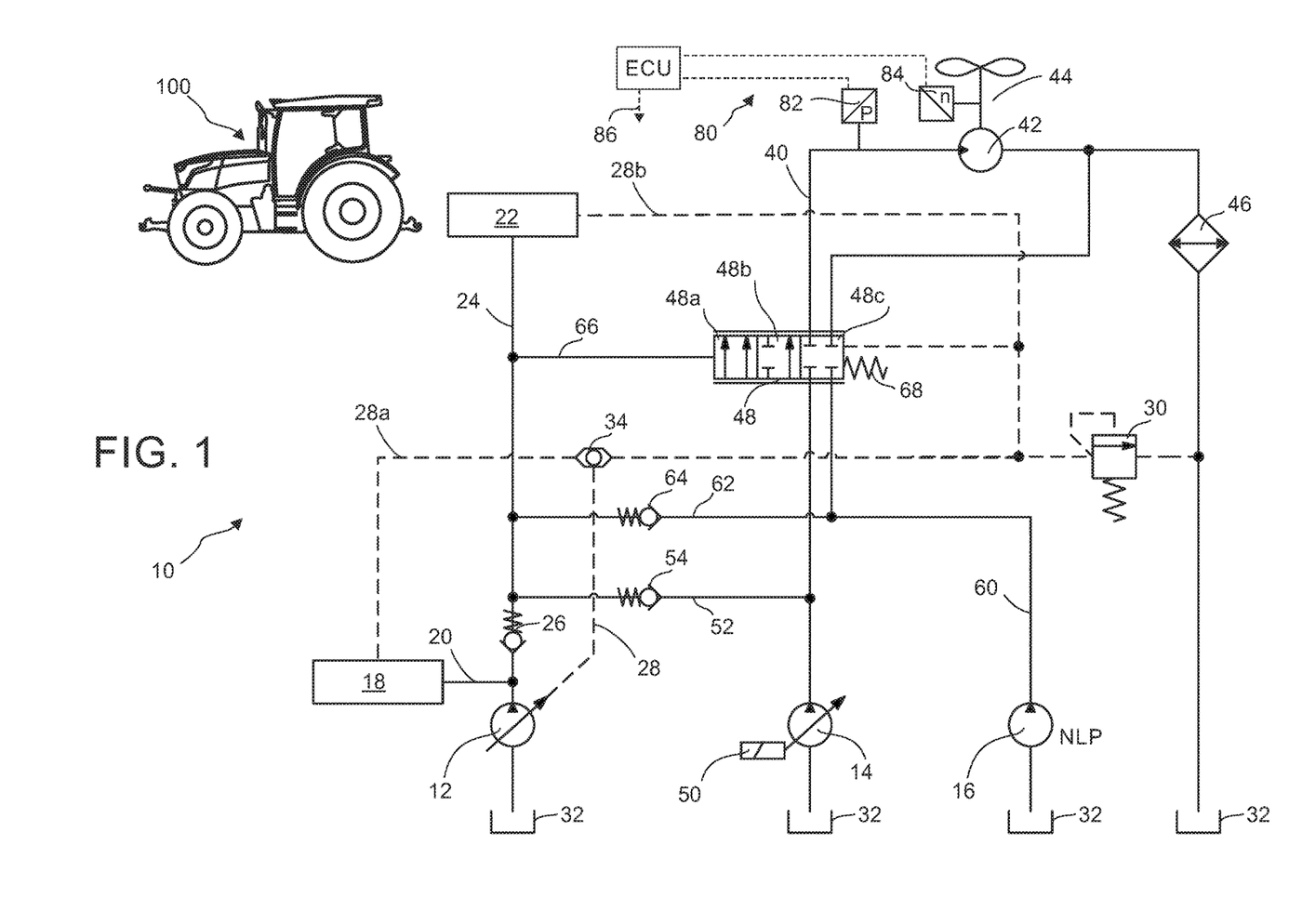
FIG. 1 is a schematic representation of an embodiment of a pressurized fluid supply system.

FIG. 1 illustrates schematically a first embodiment of a fluid supply system 10, which is suitable for use in an agricultural vehicle, such as an agricultural tractor 100. The fluid supply system 10 is a hydraulic system and includes three pumps, 12, 14, 16 for supplying pressurized hydraulic fluid (oil) to different circuits on the tractor 100. The pumps are a main supply pump 12, a cooling fan pump 14, and an emergency steering pump 16.

The main supply pump 12 may be a variable displacement type pump operable to generate a fluid pressure up to 200 bar or more, for example. The main supply pump 12 is driven by the prime mover of the vehicle and supplies auxiliary hydraulic systems 18 (indicated schematically in FIG. 1) which include various hydraulic consumers on the tractor, for example front and/or rear linkages, main valve manifold and/or a power beyond supply system, via main supply circuit 20. In addition, the main supply pump 12 delivers oil to a steering system 22 (indicated schematically in FIG. 1) via a steering circuit 24. The main supply pump 12 is connected to the steering circuit 24 though a first check valve 26 that prevents pressurized fluid flow to the main supply pump 12 from the steering circuit 24 and prevents the other pumps 14, 16 from counteracting the main supply pump 12.

The displacement (and thereby mass-flow) of the main supply pump 12 is controlled by a load-sensing circuit 28. The load-sensing circuit 28 is connected to the major consumers and is configured to regulate the delivery of the main supply pump 12 according to current requirements. The load sensing circuit 28 is connected to the auxiliary hydraulic systems 18 by an auxiliary hydraulic system load sensing circuit 28a and to the steering system 22 by a steering system load sensing circuit 28b. The load sensing circuit 28 is connected to a pressure limiting valve 30 that opens a vent connection to a hydraulic fluid storage tank or reservoir 32 if pressure in the load sensing circuit exceeds a predetermined limit. For example, the pressure limiting valve 30 may be set to open at a pressure in the region of about 175 bar. The load sensing circuit 28 is connected with the auxiliary hydraulic systems 18 load sensing circuit 28a and the steering system 22 load sensing circuit 28b by a shuttle valve 34. The shuttle valve 34 provides a hydraulic OR functionality (i.e., logical control) to forward the highest load sensing signal/pressure coming from either the steering system 22 or from the auxiliary hydraulic systems 18 to the main supply pump 12. The shuttle valve also ensures that the load sensing signals from the steering system 22 and the auxiliary hydraulic systems 18 do not counteract one another. This ensures that the highest load sensing pressure/signal coming from the steering system 22 or the auxiliary hydraulic systems 18 is used to determine the required output from the pump 12.

The cooling fan pump 14 is operative to supply a cooling fan circuit 40. The cooling fan pump 14 may also supply fluid up to a pressure of about 200 bar or more. The cooling fan circuit 40 includes a hydraulic cooling fan motor 42 drivingly connected to a cooling fan 44 and a cooling fan circuit heat exchanger 46. The cooling fan circuit heat exchanger 46 may cool the fluid in the cooling fan circuit 40. The cooling fan circuit heat exchanger 46 is shown in FIG. 1 spaced from the cooling fan 44 for clarity reasons; however, in a vehicle 100, the cooling fan circuit heat exchanger 46 is typically installed in the airflow from the cooling fan 44. The cooling fan circuit heat exchanger 46 may be installed as part of a main cooling package having several heat exchangers for cooling various systems of the vehicle which might include, as examples only, engine cooling fluid, combustion air, or exhaust gas. After passing through the cooling fan circuit heat exchanger 46, the fluid is returned to fluid tank 32. The flow of pressurized fluid in the cooling fan circuit 40 from the cooling fan pump 14 to the cooling fan motor 42 is directed through a prioritization valve 48.

In the embodiment shown in FIG. 1, the cooling fan pump 14 is a variable displacement pump and the cooling fan motor 42 is a constant displacement motor. The cooling fan pump 14 is driven by the vehicle prime mover, and its displacement (and thereby mass-flow) is controlled by a solenoid valve 50 integrated in cooling fan pump 14. Control of the displacement of cooling fan pump 14 will be described in more detail below.

In addition to supplying the cooling fan circuit 40, the cooling fan pump 14 also delivers fluid into a secondary steering circuit 52 connected to the steering circuit 24. This enables the cooling fan pump 14 to support the main supply pump 12 in delivering oil to the steering system 22 under certain circumstances. This would typically be required if the main supply pump 12 becomes overloaded and is not capable of providing the required fluid pressure to maintain the steering function adequately. This overload might occur, for example, if the steering system is moved very fast or if the demand for pressurized fluid from the main supply circuit 20 and connected auxiliary consumers increases too quickly for the main supply pump 12 to provide. A second check valve 54 between the secondary steering circuit 52 and the steering circuit may prevent fluid flowing from the steering circuit 24 towards the cooling fan pump 14 and into the cooling fan circuit 40, preventing the cooling fan pump 14 and main supply pump 12 counteracting each other. The flow of pressurized fluid from the cooling fan pump 14 to the cooling fan motor 42 and the steering system 22 is controlled by the prioritization valve 48. The secondary steering circuit 52 is connected to the cooling fan circuit 40 at a position upstream of the prioritization valve 48.

The emergency steering pump 16 is connected to an emergency steering pump circuit 60 which usually directs fluid from the pump back to the fluid tank 32 through the prioritization valve 48. The emergency steering pump 16 may also supply fluid up to a pressure of about 200 bar or more. As illustrated in FIG. 1, the flow from the emergency steering pump 16 can be directed from the prioritization valve 48 to join the cooling fan circuit 40 downstream of the cooling fan motor 42 but upstream of the cooling fan circuit heat exchanger 46, so as to pass through the heat exchanger before being returned to the tank. However, flow from the emergency steering pump 16 may be routed from the valve 48 to the tank 32 in any suitable manner.

The emergency steering pump 16 is also connected with the steering circuit 24 through an emergency steering supply line 62. A third check valve 64 between the emergency steering supply line 62 and the steering circuit 24 may prevent fluid flowing in a reverse direction from the steering circuit 24 into the emergency steering pump circuit 60, preventing the main supply pump 12 and the emergency steering pump 16 counteracting each other. Flow of pressurized fluid from the emergency steering pump 16 to the tank 32 also passes through and is regulated by the prioritization valve 48. The emergency steering supply line 62 is connected to the emergency steering pump circuit 60 at a position upstream of the prioritization valve 48.

Unlike the main supply pump 12 and the cooling fan pump 14, which are driven from the prime mover, the emergency steering pump 16 driven by the ground-engaging members (wheels or tracks). Accordingly, in the event the prime mover should fail, for example if the prime mover is an engine that stalls, or should both the main supply pump 12 and the cooling fan pump 14 fail, the emergency steering pump will continue to be driven by the vehicle's ground engaging members so long as the vehicle is moving and so is able to provide pressurized fluid to the steering system as an emergency backup. The emergency steering pump 16 can be described as a ground-speed driven pump. The emergency steering pump 16 is generally a smaller pump than the main supply pump or the cooling fan pump because it is only required to provide a basic emergency steering function which requires the driver to apply higher steering forces than during normal operation of the vehicle.

Operation of the prioritization valve 48 to regulate the supply of pressurized fluid from the cooling fan pump 14 and the emergency steering pump 16 will now be described.

The prioritization valve 48 may be a spindle valve having a spindle with three positions 48a, 48b, 48c corresponding with three operative configurations of the prioritization valve 48. The spindle is biased in a first direction—to the right as the prioritization valve 48 is illustrated in FIG. 1—by the fluid pressure in the steering circuit 24, which is connected to a first control port on one side of the valve by a fluid line 66. The spindle is biased in the opposite direction—to the left as shown in FIG. 1—by the fluid pressure (the load-sensing signal) in the load sensing circuit 28b, which is connected to a control port on the opposite side of the valve, and by a two-stepped spring set 68. For the example described below, the two-stepped spring set 68 may provide biasing forces equivalent to 10 bar (when compressed to the position 48a) and 6 bar (when compressed to position 48b). The load sensing signal to the prioritization valve 48 is taken from load sensing circuit 28b on the steering system side of the shuttle valve 34 and so is representative of the load sensing signal (fluid pressure) coming from the steering system.

The operating conditions under which the three positions or operative configurations of the prioritization valve 48 are selected are as follows:

Position 48*a*: the prioritization valve 48 will be moved to the first operative position 48*a* when the main supply pump 12 is operationally capable of maintaining the required pressure for the steering function. In this case, the fluid pressure in the steering circuit 24 is at or greater than 10 bar plus the load-sensing signal and the valve spindle is moved to position 48*a*. In position 48*a*, which can be called an open position, the prioritization valve 48 allows the pressurized fluid output from the cooling fan pump 14 to flow substantially unrestricted through the valve to the cooling fan motor 42, the cooling fan circuit heat exchanger 46, and back to the tank 32. The fluid flow output from the emergency steering pump 16 is also routed through the prioritization valve 48 substantially unrestricted to pass back to the tank 32.

Position 48*b*: the prioritization valve 48 will be moved to its second or intermediate operative position 48*b* when the main supply pump 12 is not capable of maintaining the required fluid pressure for the steering function unassisted. This may occur if the consumers of the auxiliary hydraulic systems 18 have a high demand and/or a very fast steering movement occurs. In these circumstances, if pressure in the steering circuit 24 falls below 10 bar plus the load-sensing signal, the steering prioritization valve spindle is moved into the intermediate position 48*b*. In this position 48*b*, the prioritization valve 48 blocks or restricts the flow of pressurized fluid from the cooling fan pump 14 to the cooling fan motor 42 so that the cooling fan pump 14 supplies pressurized fluid to the steering system 22 through the secondary steering circuit 52 and the second check valve 54. However, the fluid flow from the emergency steering pump is routed through the prioritization valve 48 substantially unrestricted to return to the tank 32. When the fluid flow from the cooling fan pump 14 through the prioritization valve 48 is restricted or blocked, the pressure of the fluid in the cooling fan circuit 40 upstream of the prioritization valve and in the secondary steering circuit 52 increases. This causes the second check valve 54 to open when the pressure in the cooling fan circuit 40 upstream of the prioritization valve 48 and in the secondary steering circuit 52 is higher than that in the steering circuit 24 by a threshold amount so that fluid from the cooling fan circuit is delivered into the steering circuit 24.

Position 48*c*: the prioritization valve 48 will be moved to its third position 48*c* when the combined outputs of the main supply pump 12 and the cooling fan pump 14 are insufficient to maintain the required pressure for the steering function. This might occur if one or both of the main supply pump 12 and the cooling fan pump 14 fail or are not being driven, such as due to a failure of the vehicle prime mover. In these conditions, if the fluid pressure in the steering circuit 24 falls below 6 bar (typically there would be no load sensing signal in these circumstances) and the valve springs 68 move the valve spindle to place the prioritization valve 48 in the third position 48*c*. In this position, which can be referred to as a closed position, the flow of pressurized fluid (if any) from the cooling fan pump 14 to the cooling fan motor 42 through the valve is blocked. The flow of pressurized fluid from the emergency steering pump 16 through the valve to the tank 32 is also blocked so that pressurized fluid from the emergency steering pump 16 is routed through the emergency steering supply line 62 and third check valve 64 to the steering circuit 24 and the steering system 22. The cooling fan pump 14 is still connected to the steering circuit 24 with the prioritization valve 48 in this position so that it can support the steering function if possible (for example if a temporary failure occurred). When the fluid flow from the emergency steering pump 16 through the prioritization valve 48 is blocked and the vehicle is moving, the pressure of the fluid in the emergency steering pump circuit 60 upstream of the prioritization valve 48 increases. This causes the third check valve 64 to open when the pressure in the emergency steering pump circuit 60 upstream of the prioritization valve 48 and in the emergency steering supply line 62 is higher than that in the steering circuit 24 by a threshold amount so that fluid from the cooling fan circuit 40 is delivered into the steering circuit 24.

It will be appreciated that the threshold pressures in the steering circuit 24 that result in the spindle of the prioritization valve 48 moving between the various operative positions 48*a*, 48*b*, 48*c* can be selected as appropriate for any given fluid supply system. It will also be appreciated that other prioritization valve arrangements could be adopted provided that the valve can be placed in different operative configurations so as to either allow unrestricted flow of fluid from the cooling fan pump to the cooling motor or to restrict this flow when fluid flow from the cooling fan pump 14 is required to supplement the flow from the main supply pump 12 to the steering system 22. Furthermore, the flow of fluid from the emergency steering pump 14 to the tank 32 need not be regulated by the same valve as the flow from the cooling fan pump but could be regulated by a separate valve. In this case, the prioritization valve 48 might only have two operative configurations, a first position 48*a* in which the fluid flow from the cooling fan pump 14 to the cooling fan motor 42 is unrestricted by the valve and a second position 48*b* in which the flow is restricted. The prioritization valve in this case may be a proportional valve in which the degree by which the fluid flow is restricted varies in dependence on the pressure of the fluid in the steering system circuit when the valve is in its second operative configuration.

An advantage of the pressurized fluid supply system 10 depicted in FIG. 1 is that the cooling fan pump 14 can be used to both drive the cooling fan motor 42 and act as a secondary steering pump, thus reducing the number of pumps required where a hydraulically driven cooling fan is utilised. In contrast to a conventional fluid supply system in which the secondary steering pump just returns fluid to the tank 32 when main supply pump 12 is operationally capable of maintaining the required pressure for the steering function, the cooling fan pump 14 in the supply system 10 can be used to supply the cooling fan when it is not required to support the steering system and so is functionally operative most or all of the time. This improves the overall efficiency of the system.

Furthermore, the use of a common pump 14 to supply a cooling fan motor 42 and the steering system 22 does not impair the function of the supply system 10 because during normal operation, a permanently high steering demand with simultaneous undersupply by the main supply pump 12 is unlikely so that the cooling function provided by the cooling fan pump 14 is typically only reduced for short periods of time.

The fluid supply system 10 may therefore provide increased efficiency at lower costs while providing full safety with regard to steerability.

At least when the prioritization valve 48 is in its intermediate position 48*b*, it may function as a proportional valve to direct some of the pressurized fluid from the cooling fan pump 14 to the steering system 22 while still maintaining a supply of fluid from the cooling fan pump to the cooling fan motor 42. In this case, the prioritization valve 48 may restrict the flow of pressurized fluid from the cooling fan pump 14 to the cooling fan motor 42 but not fully block it. The degree of restriction may be variable so that the amount of pressurized fluid from the cooling fan pump 14 diverted to the steering system 22 increases proportionally to the amount by which the pressure in the steering circuit 24 falls below the threshold to move the prioritization valve 48 to its second position 48b. Thus, the greater the drop in pressure in the steering circuit 24, the more pressurized fluid is diverted from the cooling fan pump circuit to the steering system to maintain steering function. In this sense, the valve spindle may have a range of movement when the prioritization valve 48 is in its second, intermediate position 48b.

Because the flow of pressurized fluid from the cooling fan pump 14 to the steering system 22 is prioritized over the flow to the cooling fan motor 42, it is preferable to have a control system 80 to ensure sufficient supply to the cooling fan motor 42 in all, or at least most, non-emergency operating conditions.

When using the cooling fan pump 14 to provide a secondary supply for the steering system 22, there may be circumstances in which the steering system 22 is taking a high level of fluid supply from the cooling fan pump 14 which would otherwise leave insufficient fluid pressure to drive the cooling fan motor 42 and cooling fan 44 in order to maintain a desired level of, or at least adequate, cooling. This would result in low cooling capacity and could lead to damage to various systems of the vehicle. To overcome this issue, the an electronic control system 80 may be configured to maintain the input drive power delivered by the cooling fan motor 42 to the cooling fan 44 substantially constant or at a demanded value when possible.

If the cooling fan pump 14 is a variable displacement pump, as shown in FIG. 1, the displacement of the pump 14 can be changed to vary the mass-flow output of the pump 14. Accordingly, when the steering system 22 makes a demand on cooling fan pump 14 and the prioritization valve 48 moves to its second position 48b, the control unit 80 is operative to increase the displacement of the pump 14, and so increase the mass-flow from the pump 14, to compensate for the additional demand being made on it without compromising operation of the cooling fan motor 42 and cooling fan 44. When the demand from the steering system 22 stops and the prioritization valve 48 returns to its first position 48a, the control system 80 is operative to reduce the displacement of the cooling fan pump 14 so that the fluid flow through the cooling fan motor 42 is maintained substantially constant.

The control system 80 may include a pressure sensor 82 for monitoring the pressure in the cooling fan circuit 40 between the prioritization valve 48 and the cooling fan motor 42. The fluid pressure in the cooling fan circuit 40 is related to the flow rate such that if the flow rate of fluid through the cooling fan circuit 40 falls, the pressure in the circuit 40 will also fall. The pressure sensor 82 provides an input to an electronic control unit (ECU) which forms part of the control system 80 and which is operatively connected with the solenoid valve 50 (the connection as indicated at 86) for varying the displacement of the cooling fan pump 14. The ECU is configured to regulate the displacement of the cooling fan pump 14 based at least in part on the fluid pressure in the cooling fan circuit between the prioritization valve 48 and the motor 42 as determined by the pressure sensor 82. If the fluid flow from the cooling fan pump 14 to the cooling fan motor 42 drops, such as due the prioritization valve 48 moving to its second position 48b to direct some of the fluid from the cooling fan pump 14 to the steering system 22, the drop in pressure is detected by the pressure sensor 82 and the ECU in dependence on an input for the pressure sensor 82 actuates the solenoid valve 50 to increase the displacement of the cooling fan pump 14 to provide a higher mass-flow from the pump to restore, so far as possible, the flow rate of fluid through the motor 42 and hence maintain the input drive power delivered by the cooling fan motor 42 to the cooling fan 44 constant or at a demanded value. Should the pressure in the cooling fan circuit 40 reach or exceed a target value sufficient to maintain the input drive power delivered by the cooling fan motor 42 to the cooling fan 44 constant or at a demanded value (e.g., should the prioritization valve 48 move back to its first position when the steering system 22 is no longer showing demand on the cooling fan pump), the control system adjusts the cooling fan pump 14 to reduce displacement until the pressure in the cooling fan circuit is at a suitable level.

In another embodiment, the control system 80 monitors the speed of the cooling fan 44 using a fan speed sensor 84 as part of a closed loop control such that the displacement of the cooling fan pump 14 is varied to maintain the speed of the fan constant or to vary the fan speed to meet a cooling demand. In a further alternative, the control system 80 may monitor both the fluid pressure in the cooling fan circuit 40 using a pressure sensor 82 and the speed of the fan using a fan speed senor 84 and vary the displacement of the pump 14 to regulate the displacement of the pump as required to maintain adequate cooling.

The control system 80 may be configured to vary the displacement of the cooling fan pump 14 hydraulically by means of a load sensing line to feedback the demand of the cooling fan motor 42 in a similar manner to that described above for the main supply pump 12. Such a system may only deliver a constant input power to the cooling fan 44 or may adapt the feedback load sensing signal from the cooling fan motor 42 before adjusting the cooling fan pump 14.

Figure 2:
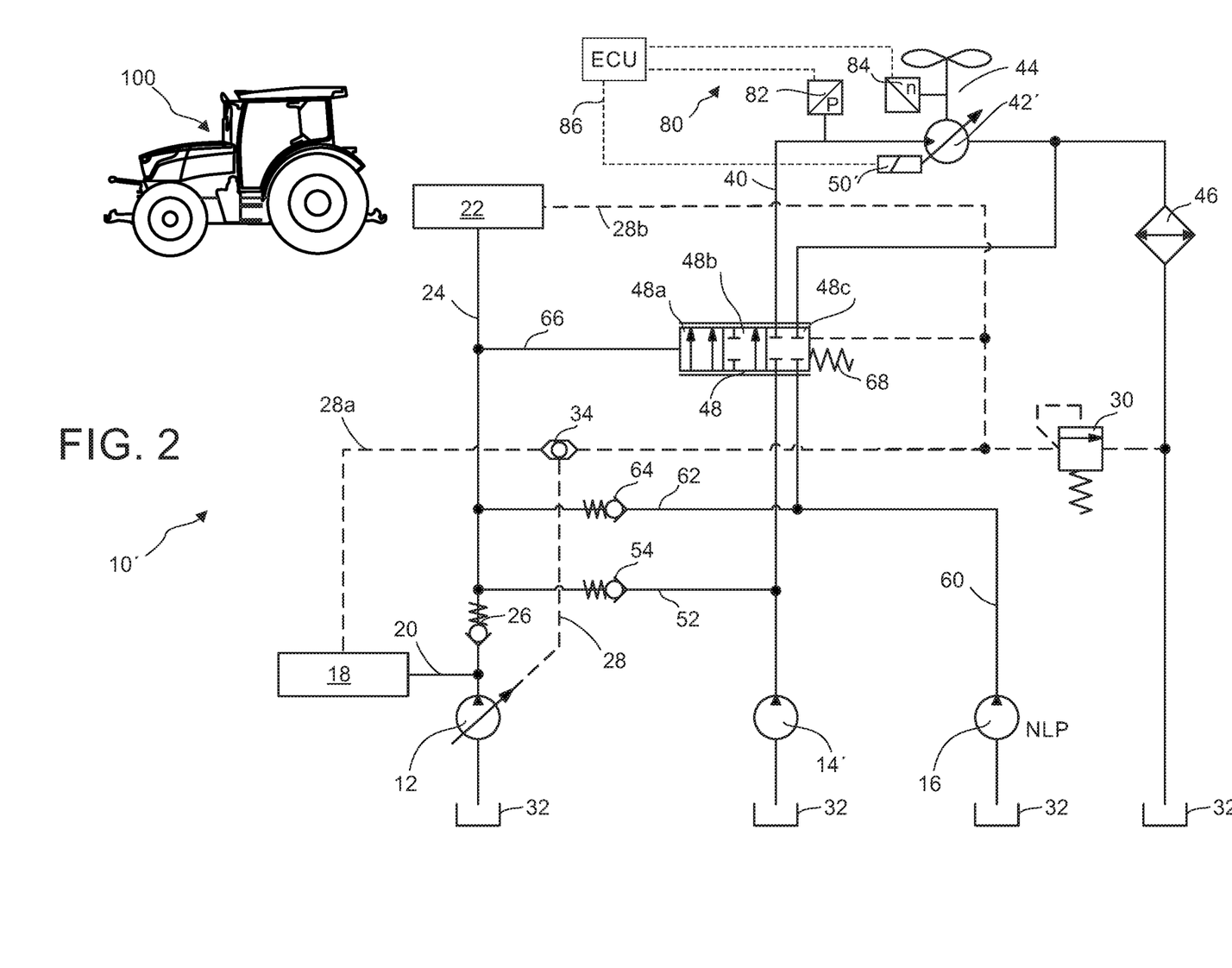
FIG. 2 is a schematic representation of an alternative embodiment of a pressurized fluid supply system.

In the control system 10 as described above, the cooling fan pump 14 is a variable displacement pump and the cooling fan motor 42 is a fixed displacement motor. FIG. 2 illustrates another embodiment of a fluid supply system 10', which is substantially identical to the fluid supply system 10 of FIG. 1, except that the cooling fan pump 14' is a fixed displacement pump and the cooling fan motor 42' is a variable displacement motor. In other respects, the fluid supply system 10' is constructed and operates substantially the same as the previous embodiment illustrated in FIG. 1. Accordingly, only those aspects of the supply system 10' which differ from those of the previous embodiment 10 will be described in detail. The reader should refer to the above description of the previous embodiment 10.

The supply system 10' operates as described above except that the control system 80' is operative to vary the displacement of the cooling fan motor 42' using a solenoid valve 50' incorporated into the motor in order to maintain the drive to the cooling fan 44 substantially constant or to vary the drive to meet a cooling demand. In this case, in response to a fall in the fluid flow through the motor 42', leading to a reduction in pressure in the cooling fan circuit and/or a reduction in fan speed, the control system compensates by reducing the displacement of the motor 42' so that the internal pressure in the fan motor is increased, so as to keep the input drive power delivered to the cooling fan 42 constant or at a demanded value. Should the pressure in cooling fan circuit 40 reach or exceed a target value again (e.g., when the steering system 22 is no longer placing a demand on the cooling fan pump 14'), the displacement of the cooling fan motor 42' is increased to maintain the input drive power to the cooling fan 44 at the desired value.

As in the previous embodiment, the control system 80' may use a pressure sensor 82 for monitoring the pressure in the cooling fan circuit 40 and/or a fan speed sensor 84 for monitoring the speed of the fan 44 to regulate the fluid flow through the cooling fan motor 42'.

Furthermore, in both the fluid supply system 10 of FIG. 1 and the fluid supply system 10' of FIG. 2, the control system 80, 80' may proactively monitor the demand of the steering system 22 and vary the displacement of the pump 14 or the motor 42' prior to any change in pressure of the cooling fan circuit 40 or speed of the cooling fan 44.

The control system 80, 80' may for example monitor the movement of a steering wheel, or other steering control, such as with a respective angle sensor on the steering wheel. If the steering wheel is moved by a certain amount or at a certain velocity which is likely to give rise to the steering system 22 placing a demand on the cooling fan pump 14, 14', the control system 80, 80' is operative to vary the displacement of the variable displacement cooling fan pump 14 or motor 42' before the prioritization valve 48 moves to the second position 48b and fluid supply from the cooling fan pump 14, 14' to the cooling fan motor 42, 42' drops. The change in displacement may thereby be made dependent on the pressure change determined by pressure sensor 82 and/or the change in fan speed detected by the fan speed sensor 84 and/or the steering wheel movement. This helps the fluid supply system 10, 10' maintain steering capability and sufficient cooling capacity in various situations. It will be appreciated that movement of other parts of the steering system 22 could be used to predict an increased fluid demand by the steering system 22.

Though the control system 80, 80' is primarily provided to maintain the drive to the cooling fan 44 within limits despite a variable demand being placed on the cooling fan pump 14, 14' by the steering system 22, it can also be used to vary the cooling fan speed to meet differing cooling demands. Thus the control system 80, 80' could be configured to adjust displacement of the cooling fan pump 14 or the cooling fan motor 42', as appropriate, in order to increase the speed of the cooling fan 44 when there is a high demand for cooling and/or to reduce the speed of the fan when the cooling demand is lower.

It is envisaged that the fluid supply system 10, 10' described above may include additional elements, such as a pilot control for connection with the main supply circuit 20 and the steering circuit 24 when a constant displacement cooling fan pump 14' as in the embodiment of FIG. 2 is installed. Such a system is described in U.S. Patent Application Publication US 2013/0312401, Pilot Pressure Supply System, published Nov. 28, 2013.

As is well known in the art, the various circuits 20, 24, 40 in a fluid supply system 10, 10' may include pressure limiting valves to protect the pumps and other components, including the supplied consumers of the auxiliary hydraulic systems 18 in the case of the main circuit 20, from unintended high pressure in the system, for example if hoses are squeezed and oil flow is blocked which would otherwise result in damage. Typically, hydraulic systems on an agricultural vehicle operate at approximately 200 bar, in which case the pressure limiting valves may be set to open at around 250 bar. However, it will be appreciated that in fluid supply system 10, 10', the operating pressure may be higher or lower than 200 bar and that the pressure at which the pressure limiting valves are set to open selected accordingly.

It will also be appreciated that the fluid flow rates provided by the various pumps 12, 14, and 16 can be selected as appropriate to the vehicle requirements.

All references cited herein are incorporated herein in their entireties. If there is a conflict between definitions herein and in an incorporated reference, the definition herein shall control.

What is claimed is:

1. A pressurized fluid supply system for an agricultural vehicle, the system comprising:
   a main supply pump configured to provide a first source of pressurized fluid to a steering system of the vehicle through a steering circuit and to other consumers through a main circuit;
   a cooling fan pump configured to provide a source of pressurized fluid to a cooling fan motor driving a cooling fan through a cooling fan circuit; and
   a prioritization valve configured to regulate flow of fluid from the cooling fan pump to the cooling fan motor, the prioritization valve having at least two operative configurations and movable between the at least two operative configurations in dependence on a fluid pressure in the steering circuit;
   wherein the cooling fan pump is fluidly connectable with the steering circuit to provide a second a source of pressurized fluid to the steering system;
   wherein the prioritization valve is configured to adopt a first operative configuration in which fluid flow from the cooling fan pump to the cooling fan motor through the prioritization valve is substantially unrestricted when the fluid pressure in the steering circuit is at or above a first threshold value and to adopt a second operative configuration in which fluid flow from the cooling fan pump to the cooling fan motor through the prioritization valve is at least partially restricted when the fluid pressure in the steering circuit is below the first threshold value; and
   wherein the prioritization valve has a third operative configuration in which fluid flow from the cooling fan pump to the cooling fan motor through the prioritization valve is substantially blocked, the prioritization valve being configured to adopt the second operative configuration when the fluid pressure in the steering circuit is below the first threshold value but at or above a second threshold value lower than the first threshold value and to adopt the third operative configuration when the fluid pressure in the steering circuit is below the second threshold value.

2. The pressurized fluid supply system of claim 1, wherein the prioritization valve comprises a spool valve having a spool defining at least two positions corresponding to the at least two operative configurations, wherein the fluid pressure in the steering circuit applied to the spool drives spool movement in a first direction and wherein a fluid pressure in a steering system load sensing circuit and a biasing force from at least one resilient member applied to the spool drive the spool in a second direction opposite to the first direction.

3. The pressurized fluid supply system of claim 2, wherein the valve spool has three positions, each of the three positions corresponding to a respective one of the three operative configurations.

4. The pressurized fluid supply system of claim 2, wherein the at least one resilient member comprises a two-stepped spring set.

5. The pressurized fluid supply system of claim 1, wherein the prioritization valve is operative to restrict but not fully block the flow of fluid through the valve from the cooling fan pump to the cooling fan motor when in the second operative configuration.

6. The pressurized fluid supply system of claim 5, wherein the prioritization valve is configured such that a degree to which the flow of fluid through the valve from the cooling fan pump to the cooling fan motor is restricted when in the second operative configuration is variable, dependent on the fluid pressure in the steering circuit.

7. The pressurized fluid supply system of claim 1, wherein one of the cooling fan pump and the cooling fan motor is a variable displacement machine, and wherein the fluid supply system further comprises a control system operative to adjust a displacement of the variable displacement machine.

8. The pressurized fluid supply system of claim 1, wherein the cooling fan pump comprises a variable displacement pump, and wherein the cooling fan motor comprises a constant displacement motor.

9. The pressurized fluid supply system of claim 1, wherein the cooling fan pump comprises a constant displacement pump, and wherein the cooling fan motor comprises a variable displacement motor.

10. The pressurized fluid supply system of claim 1, wherein the fluid supply system is a hydraulic fluid supply system.

11. An agricultural vehicle comprising the pressurized fluid supply system of claim 1.

12. The agricultural vehicle of claim 11, wherein the agricultural vehicle is a self-propelled tractor.

13. The agricultural vehicle of claim 12, wherein the other consumers comprise at least one consumer selected from the group consisting of a front linkage, a rear linkage, a main valve manifold, and a power beyond supply system.

14. A pressurized fluid supply system for an agricultural vehicle, the system comprising:
 a main supply pump configured to provide a first source of pressurized fluid to a steering system of the vehicle through a steering circuit and to other consumers through a main circuit;
 a cooling fan pump configured to provide a source of a pressurized fluid to a cooling fan motor driving a cooling fan through a cooling fan circuit;
 a prioritization valve configured to regulate flow of fluid from the cooling fan pump to the cooling fan motor, the prioritization valve having at least two operative configurations and movable between the at least two operative configurations in dependence on a fluid pressure in the steering circuit; and
 an emergency steering pump fluidly connectable with a fluid reservoir through an emergency steering pump circuit;
 wherein the cooling fan pump is fluidly connectable with the steering circuit to provide a second a source of pressurized fluid to the steering system;
 wherein the prioritization valve is configured to adopt a first operative configuration in which fluid flow from the cooling fan pump to the cooling fan motor through the prioritization valve is substantially unrestricted when the fluid pressure in the steering circuit is at or above a first threshold value and to adopt a second operative configuration in which fluid flow from the cooling fan pump to the cooling fan motor through the prioritization valve is at least partially restricted when the fluid pressure in the steering circuit is below the first threshold value; and
 wherein the prioritization valve is operative to regulate the flow of fluid through the emergency steering pump circuit to the fluid reservoir, wherein the emergency steering pump circuit is fluidly connectable with the steering circuit at a position upstream of the prioritization valve, and wherein the flow of fluid from the emergency steering pump through the prioritization valve to the reservoir is substantially unrestricted when the prioritization valve is in either of its first and second operative configurations.

15. The pressurized fluid supply system of claim 14, wherein the prioritization valve has a third operative configuration in which fluid flow from the cooling fan pump to the cooling fan motor through the prioritization valve is substantially blocked, wherein the prioritization valve is configured to adopt the second operative configuration when the fluid pressure in the steering circuit is below the first threshold value but at or above a second threshold value lower than the first threshold value and to adopt the third operative configuration when the fluid pressure in the steering circuit is below the second threshold value, and wherein the flow of fluid from the emergency steering pump through the prioritization valve is substantially blocked when the prioritization valve is in its third operative configuration.

16. A pressurized fluid supply system for an agricultural vehicle, the system comprising:
 a main supply pump configured to provide a first source of pressurized fluid to a steering system of the vehicle through a steering circuit and to other consumers through a main circuit;
 a cooling fan pump configured to provide a source of pressurized fluid to a cooling fan motor driving a cooling fan through a cooling fan circuit; and
 a prioritization valve configured to regulate flow of fluid from the cooling fan pump to the cooling fan motor, the prioritization valve having at least two operative configurations and movable between the at least two operative configurations in dependence on a fluid pressure in the steering circuit;
 wherein the cooling fan pump is fluidly connectable with the steering circuit to provide a second a source of pressurized fluid to the steering system;
 wherein the prioritization valve is configured to adopt a first operative configuration in which fluid flow from the cooling fan pump to the cooling fan motor through the prioritization valve is substantially unrestricted when the fluid pressure in the steering circuit is at or above a first threshold value and to adopt a second operative configuration in which fluid flow from the cooling fan pump to the cooling fan motor through the prioritization valve is at least partially restricted when the fluid pressure in the steering circuit is below the first threshold value;
 wherein one of the cooling fan pump and the cooling fan motor is variable displacement machine, and wherein the fluid supply system further comprises a control system operative to adjust a displacement of the variable displacement machine; and
 wherein the control system is operative to adjust the displacement of the variable displacement machine to maintain an input drive power provided by the cooling fan motor to the cooling fan substantially constant.

17. The pressurized fluid supply system of claim 16, wherein the control system comprises at least one sensor configured to determine the input drive power provided by the cooling fan motor to the cooling fan.

18. The pressurized fluid supply system of claim 17, wherein the at least one sensor comprises at least one sensor selected from the group consisting of a pressure sensor configured to monitor the pressure of the fluid supplied to the cooling fan motor and a speed sensor configured to determining a speed of the cooling fan.

19. The pressurized fluid supply system of claim 17, wherein the control system is configured to adjust the displacement of the variable displacement machine based at least in part on the determined input drive power.

\* \* \* \* \*